United States Patent

[11] 3,607,696

| [72] | Inventors | Blair E. Cornish<br>Stone Ridge;<br>Eugene P. Damm, Jr., Poughkeepsie;<br>Sidney L. Phillips, Poughkeepsie, all of N.Y. |
|---|---|---|
| [21] | Appl. No. | 769,027 |
| [22] | Filed | Oct. 21, 1968 |
| [45] | Patented | Sept. 21, 1971 |
| [73] | Assignee | International Business Machines Corporation<br>Armonk, N.Y. |

[54] REVERSIBLE ELECTROPHORESIS AND APPLICATIONS THEREOF
12 Claims, 7 Drawing Figs.

[52] U.S. Cl. ..................................................... 204/181
[51] Int. Cl. ...................................................... B01k 5/02, C23b 13/00
[50] Field of Search ......................................... 204/181

[56] References Cited
UNITED STATES PATENTS
3,200,058   8/1965   Oster ........................... 204/181

*Primary Examiner* — Howard S. Williams
*Attorneys* — Hanifin & Jancin and Robert Lieber ABSTRACT: Normally difficult to remove coatings of certain polymeric substances, including a polytetrafluoroethylene, are removed by the presently disclosed electrical stripping technique. The coatings are deposited by electrophoresis on a conductive surface of an object used as an electrode and stripped or removed from the same surface by applying a voltage of opposite polarity while the coating particles are still in an uncoalesced condition due to retention of electrolyte fluid between the particles. Certain of these coatings are strippable even after removal of the base electrode from the electrolyte medium, provided that sufficient electrolyte moisture is retained to keep the coating in a solvated condition until reimmersion and application of the reverse voltage. The deposition and stripping actions are repeatable an indefinite number of times for particular coating substances under particular conditions. This is used in a closed system to construct specific devices based on selectively variable thermal resistance effects and visual indication effects. These effects have an associated memory property in the sense that the effect persists indefinitely upon removal of the electromotive force which is depositing or stripping the coating.

INVENTORS
BLAIR E. CORNISH
EUGENE P. DAMM, JR.
SIDNEY L. PHILLIPS

BY Robert Lieber

ATTORNEY

PATENTED SEP 21 1971 3,607,696

REVERSIBLE ELECTROPHORESIS AND APPLICATIONS THEREOF

BACKGROUND OF THE INVENTION

1. Field of the Invention

The invention relates to reversible electrophoretic coating process and application thereof to provide for selective removal of disclosed coating substances which are normally difficult to remove and/or special devices based upon the ability of certain of the disclosed coating substances to undergo repeated deposition and removal. Such devices include, but are not limited to a selective heat transfer device based upon the use of a thermally resistive coating substance which can be deposited in a wide range of thicknesses and removed, and a selective visual indication device based upon the use of transparent electrode structures and coatings with occluded dyes.

2. Description of the Prior Art

British Pat. No. 514,849 discloses removing electrophoretic deposits of alkaline earth carbonate substances from a metal core and returning the removed material to an ethylene glycol electrolyte medium. The deposits are suspended in an organic binder which is intended which is intended to be evaporated in the final drying process by which the coating is made permanently adherent to the metal core. The present invention is distinguished in that the substances which are stripped are film forming polymers dispersed in aqueous media. Being film formers, such substances would not be expected to be removable. Indeed we have found that not all deposits of polymeric substances are removable by voltage reversal. The present invention is distinguished further in that for certain of the substances investigated the steps of deposition and stripping are repeatable under specific conditions. This property is shown herein to be useful to construct devices in which a coating of variable thickness or appearance is repeatedly deposited and removed, or expanded in thickness and contracted, in order to provide visual indication or thermal resistance effects subject to electrical control.

U.S. Pats. Nos. 3,200,057 to Burnside et al., and 3,200,058 to Oster disclose cyclical current reversals during electrophoretic deposition of certain colloidal polymeric paint substances. However, as observed in these patents the current reversals remove only the charged particles loosely adherent to the surface of the deposit and not the uncharged or neutralized particles incorporated in the deposit. Hence the deposition process is assertedly irreversible for the particular polymeric substances disclosed in these patents.

SUMMARY OF THE INVENTION

The present invention involves therefore the discovery that electrophoretically deposited coatings of certain film forming polymeric substances, which were previously thought to be continuous and permanent and which in a dried condition would be resistant to dissolution by chemical action, are removed easily by application of reverse voltages to the coated electrodes, provided that the reverse voltage is applied before the coating has dried. Wet coatings formed from polytetrafluoroethylene, which would be difficult to dissolve in a dried condition, are easily stripped and redispersed in the electrolyte medium by reverse electrophoretic action. Deposits of considerable continuity and thickness have been formed and stripped in this manner. Even more unusual perhaps, particular substances described herein are subject to repeated deposition and removal in a closed system.

Thus useful devices are constructible. In one disclosed example, a heat transfer device is described in which the electrically controlled thickness of an electrophoretic deposit of a mixture of rubber and polytetrafluroethylene forms a variable thermal resistance between a heat source, such as an electrical circuit component or a food refrigerator compartment, and a heat sink. The resistance condition persists indefinitely in the absence of an applied electromotive force. In a second disclosed example an indicating device is formed by electrically depositing and removing substances which change appearance in the transitions between dispersed and deposited states. Again, any indication state persists in the absence of an applied voltage.

Objects of the invention are to provide:

an electrophoretic process for selectively depositing film forming polymeric substances upon metallic substrata and for removing all or part of such deposits;

a method for conveniently distinguishing between film forming substances which form removable deposits and those which do not;

a method of utilizing colloidally dispersed electrophoretically depositable substances repeatedly in a closed system to produce changing effects at a conductive surface;

devices employing the last mentioned method of substance utilization to create variable effects–including but not limited to visual and thermal transfer effects–by electrical control signals, which effects persist after removal of the control signal.

The foregoing and other objects, features and advantages of the invention will be apparent from the following more particular description of embodiments thereof as illustrated in the accompanying drawings.

DETAILED DESCRIPTION OF THE INVENTION

We have recently observed that the class of film forming organic substances which can be deposited upon conducting surfaces by the process known as electrophoresis is subdividable into two categories; specifically, into substances which respectively retain and fail to retain a tendency to return into colloidal dispersion when subjected to reverse electromotive forces. We have found further that substances which retain this tendency do so only while in a solvated condition. These substances will redisperse only if sufficient moisture has been retained in the capillary spaces between the deposited particles to prevent the particles from coalescing into a continuous insoluble film.

We have observed that one substance which retains this tendency towards redispersion is polytetrafluoroethylene. Deposited and dried to a coalesced state this material is extremely durable and difficult to remove by chemical action. Because of its excellent dielectric properties this material is useful as an encapsulating medium for electrical circuit components. Making use of this newly observed property of redispersion we can now deposit this substance selectively without masks or other complicated devices. For example, the substance may be deposited over all exposed conductive surfaces of a printed circuit device, and conductive lead elements at the outer edges of the derive may be left exposed for attachment to external wires or leads, by immersing only the outer edges of the device in the electrolyte medium and then, while the coating is still in a solvated condition, applying a reverse e.m.f. to the conductive elements. Since the solvated condition of the coating persists for a period of minutes after removal of the device from the electrolyte, it is a simple matter to reimmerse the freshly coated edges for the terminal stripping operation.

Figure 1:
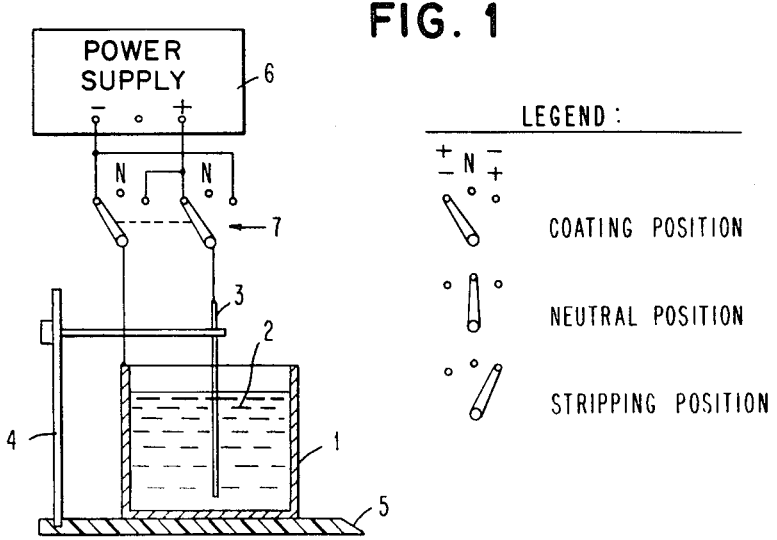
FIG. 1 illustrates the test apparatus used to assess the ability of a substance to undergo one or more cycles of electrophoretic deposition and removal.

As indicated in FIG. 1 apparatus employed to test substances for the above mentioned redispersion property includes a beaker 1 containing an electrolyte 2 in which the particles of the substance to be deposited are either dispersed or suspended, usually in a colloidal state. The inner surface of the beaker is conductive, and is constructed for example of stainless steel. The object electrode upon which the coating is formed, indicated at 3, is electrically isolated from the stainless steel electrode surface of the beaker by suspension from a ring stand 4 supported on a nonconductive base 5.

The object electrode 3 and electrode surface of the beaker 1 are connected to and disconnected from opposite polarity terminals of power supply 6 through a switch indicated generally at 7. The switch 7 has three positions; a coating position, a stripping position, and an idle or neutral position. Of course if the convenience of the switch is not required, the switch may be eliminated and the conductors extending from the electrode 3 and the surface of the beaker 1 to the terminals of the power supply may be manually reversed and disconnected. A suitable power supply for the purpose to be described is the model 214AM programmable power supply obtained from Electronic Measurements Company of Eatontown, N.J.

The shape of the object electrode is arbitrary, but we find it quite convenient to use a copper plate of rectangular shape (one-half inch by one-half inch) supported on an epoxy glass substrate. The object electrode is cleaned either with trichloroethylene or a detergent before it is immersed in the electrolyte medium. The immersed object electrode and the electrode surface of the beaker are connected respectively to positive and negative voltage terminals of the power supply in the case of anodic deposition (cathodic deposition would of course require a reverse connection). Allowing a specific time for development of a film of desired thickness, by electrophoresis of a specific electrolyte substance dispersed in aqueous solution in the beaker, the current is disconnected. Then, with the coating in a solvated condition, either because the object electrode has not been removed form the electrolyte or, if removed has not yet dried, the object electrode is partly or wholly reimmersed and connected to receive reverse polarity of voltage from the power supply. Removal of the deposit is observed visually. To aid in observation the deposition and removal operations are preferably carried out in a clear aqueous electrolyte. A buffering substance may be added if needed. We have found potassium phosphate in solution (ph 7) with the electrolyte to be suitable for this purpose. Separate beakers may be used for the deposition and removal operations if desired.

Figure 4:
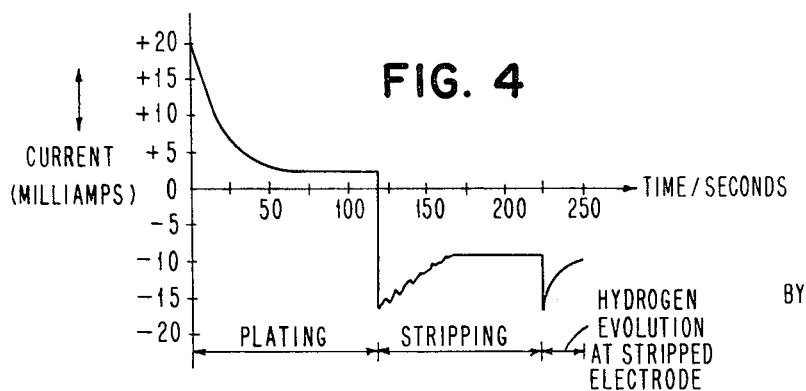
FIG. 4 is a graph indicating the time relationship between the electrical currents and the physical and chemical effects accompanying forward and reverse electrophoresis.

A typical current-time graph for deposition and stripping upon an anodically soluble electrode is shown in FIG. 4. As indicated in this FIG. upon reversal of polarity hydrogen gas is not evolved at the object electrode until the reducible cations are removed from the film. At low enough voltages, specific to the metal, even the hydrogen evolution may be eliminated. Substances investigated and results obtained are indicated in Table 1. The applied voltages were +10 volts for the deposition step and −3 volts for the removal into the potassium phosphate buffer solution (ph 7). The ability of substances to undergo more than one cycle of deposition and dispersion is indicated in the Table.

TABLE 1

| Dispersion | Effect of Polarity Reversal | | Repeatable |
|---|---|---|---|
| | Dispersion | O.1 Molar Potassium Phosphate Solution (pH 7) | |
| Polytetrafluoroethylene | stripped | stripped (Note 1) | uncertain |
| Mixture of equal parts of polytetrafluoroethylene and rubber | stripped | stripped | yes |
| Tetrafluoroethylene/hexafluoropropene copolymer | stripped | stripped | yes |
| Polyvinylacetate copolymer | no | no | no |
| Polystyrene | stripped | stripped (Note 1) | uncertain |
| Polymide | no | no | no |
| Epoxy ester | uncertain | uncertain | uncertain |
| Acrylonitrile/butadiene copolymer | uncertain | uncertain | uncertain |
| Acrylic | stripped | stripped | yes |
| Vinyl acetate/maleate copolymer | stripped | uncertain | uncertain |
| Zinc Sulfide Phosphor (investigated for display device) | stripped | stripped | yes |

Note 1

. Thick coating; flaking as well as redispersion observed.

The known or observed properties of the particular substances mentioned in Table 1 are indicated in the following brief descriptions of each. Wherever known the particle size is indicated.

Polytetrafluoroethylene (DuPont Teflon 30B)

Properties:
Specific gravity of dispersion (60solids) = 1.50
Resin weight (60% solids) =7.5 pounds/gallon
Melting Point (°C.) = 327±10
Specific gravity (sintered resin) = 2.20–2.27
Color = White
Sintering Temperature = 680° F.–700° F.

Polyvinylacetate Copolymer (Dewey and Almy Everflex MF)

Properties:
Total Solids = 51%–53%
Viscosity (25° C., Brookfield,
03 Spindle, 60 r.p.m.)
c.p.s. = 100–500 pH = 4.0–6.5
Free Monomer Content = Less than 1%
Odor = Slight, Monomer
Particle Size, Average = 0.1 micron
Weight/Gallon, Emulsion = 9.0 lbs.
Weight/Gallon, Solids = 0.76 lbs.
Borax Compatibility = Excellent

Tetrafluoroethylene/Hexafluoropropene Copolymer (DuPont Teflon FEP 120)

Properties:
Specific Gravity = 2.12–2.17
Melting Point (°F.) = 504–540
Water Absorption = Less than 0.01%
% Solids = 53–57%
Particle Size = 0.10–0.25 microns
pH = 10
Viscosity = 25 c.p.s. at room temperature
Wetting Agents = 5–7%

Polystyrene (Sinclair-Kippers Polystyrene Emulsion M)

Properties:
Color = White
Percent Total Solids = 40
Percent Styrene Monomer (Max) = 0.5
Polymer Viscosity (rel. vis. in 1% soln. in Toluene = 3.5–6)
Latex Viscosity (c.p.s. = 15–18
Latex pH = 9.5–10.5
Particle Size = Less than 0.1 micron
Shelf Life = Stable
Heat Stability (150° F. for 22 days) = Stable
Freeze Thaw Stability = Poor
Specific Gravity (28° C.) = 1.02
Weight/Gallon = 8.6

Polyamide (General Dispersions Genton 110)

Properties:
Form = Watery Liquid
Color = Milky White
Odor = None
Physiological Effects = None
Light Stability = Excellent
Heat Stability = Excellent
Stability to Freezing = Will coagulate
Shelf Life = Stable for at least 3 months
Weight/Gallon = 8.4 pounds
Percent Solids = 10±0.3
pH = 6.8–7.2
Particle Size = Less than 2 microns

Epoxy Ester (Ciba Araldite DP624)

Properties:
Viscosity, 04 Ford Cup 25° C. = 15–30 seconds
Solids Content = 50±1%
Appearance = Milky White
Weight/Gallon (Ester Emulsion) = 8.5 pounds
Weight/Gallon (Solids) = 9.0 pounds
pH = 9–8.5
Freeze Thaw Stability, 5 cycles = Pass

Acrylonitrile/Butadiene Copolymer (B.F. Goodrich Hycar 1561)

Properties:
pH = 10.0
% Solids = 41%
Surface Tension (dynes/cm.) = 50
Viscosity (Brookfield 60 r.p.m., LVF) = 24.0 c.p.s.
Type = High Acrylonitrile

Acrylic (Rohm and Haas Rhoplex AC 61)

Properties:
pH = 9.5–10.0
% Solids = 46–47%
Appearance = White Milky Liquid
Weight/Gallon = 8.9 lbs.
Specific Gravity of Solids = 1.13
Freeze Thaw Stability (5 cycles) = OK
Heat Stability (300 Hrs. at 140° F.) = OK

Vinyl Acetate/Maleate Copolymer (Airco Chemical Flexbond 150)

Properties:
Odor = Slight
Color = Milky White
Average Particle Size = 1.5 microns
Particle Charge = Neutral
Mechanical Stability = Excellent
Freeze thaw stability = stable after 5 cycles
Weight/Gallon = 8.54 pounds
Benzene Insolubles = 40–65%

No specific reasons can be given why coatings formed from certain of the foregoing materials are removable and others are not. Nor can any reason be given for the tendency of certain of these materials to undergo repeated deposition and removal by electrophoresis while other do not have this property. A possible explanation, however, is that the phenomenon of film removability is linked to physical changes on the ionic level in the process of film formation. It is known that film formation involves the viscous contraction of the coat forming substance from a discrete particulate state into a coalesced or coagulated film. With some substances this coalescence does not occur until the deposit is removed from the liquid electrolyte media and dried at elevated temperatures. This causes the retained moisture of the electrolyte medium to evaporate while the particles draw together under mutual forces of attraction into a coalesced mass.

In the case of anodically soluble electrodes it is believed that the process of redispersion may involve electrolytic plating of metal ions from the coating mass back to the object electrode surface. To separate these ions from the oppositely charged particles of coating material with which they have become paired requires a degree of mobility which may be lacking in a coalesced film.

Other substances however (e.g. those disclosed in the above-referenced Oster and Burnside et al. patents) tend to begin to coalesce as soon as they are deposited. For such substances a rapidly increasing concentration of the deposit forces the moisture of the electrolyte away from the object electrode surface. This results in rapid coalescence of the deposit and creates a barrier to free migration of metal ions detached from the object electrode. Not only would this limit the thickness of coating which could be deposited but also it may be responsible for preventing dissolution of the coating upon voltage reversal.

In support of this it is observed that the substances which do not coalesce easily, and therefore retain the tendency to permit ion migration in either direction for deposition and redispersion are also subject to development of considerably thicker coatings, probably due to their continued permeability to metal ion migration. This property of thick coating development is utilized to advantage in the heat transfer device next described.

Figure 2:
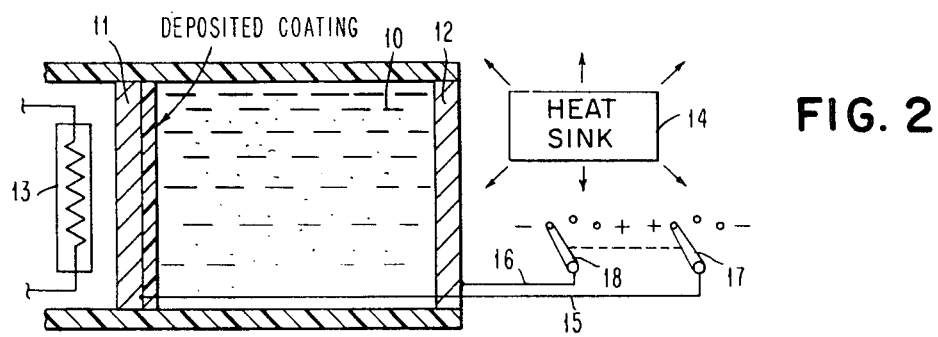
FIG. 2 illustrates in a partially schematic view a section of a heat transfer device in which thermally resistive barriers of variable thickness are constructed between a source of heat and a heat sink by electrophoresis, and maintained without further expenditure of electrical energy.

Referring to FIG. 2, a heat transfer device accordance with this invention is constructed utilizing a liquid electrolyte dispersion of a substance subject to repeated electrophoretic deposition and removal and having high thermal resistance in the concentrated deposited state and low or negligible thermal resistance in the dispersed state. We have found a mixture of equal parts of rubber and polytetrafluoroethylene suitable as the dispersion. The electrolyte is enclosed between electrically and thermally conductive inner and outer wall members, 11 and 12 respectively. A modular assembly of such wall members and enclosed electrolyte is arranged as a heat transfer jacket between several sources of heat—one such being shown schematically at 13 as a resistive component of an electrical circuit–and a heat sink 14. The heat sink may, depending upon the rate of heat transfer required, include a fluorocarbon coolant fluid circulating adjacent the outer wall 12 of the heat transfer jacket. Leads 15 and 16 extend to ganged movable contacts 17 and 18 of a three position switch, substantially identical in function to the switch arrangement 7 shown in FIG. 1, from the inner and outer walls of the jacket respectively. Thus, in the position shown a positive difference in potential would exist between inner wall 11 and outer wall 12 causing deposition of the dispersed material in concentrated form at the surface of the inner wall 11 contacting the electrolyte. In the extreme opposite position of the switch the coating would tend to redisperse into the electrolyte. In the neutral or middle position of the switch the deposited coating would would tend to remain stable at the thickness attained prior to removal of the last applied voltage.

In practice, heat jackets as generally shown in FIG. 2 would be constructed in modular sections surrounding various circuit modules of an electrical system and the electrolyte in each compartment would be subjected to an initial electrophoresis current to establish a coating of desired thickness over a surface of each modular section. This would establish a desired initial heat transfer condition between each circuit module and a common heat sink. As each section accumulates the thickness of electrophoretic deposit required to establish the desired initial thermal resistance between the associated circuit module and the common heat sink, a switch such as the switch 17, 18 indicated in FIG. 2, but separately provided for each section, would be thrown to the neutral position terminating the deposit growth, and thickness of the deposit would then persist indefinitely to provide constant thermal resistances at each section.

Assuming then that it is desired to increase or decrease the rate of heat transfer between any circuit module and the heat sink, in order for example to establish a different rate of cooling of the circuit module, the associated switch could be thrown either to the left or right of its neutral position to cause deposition or removal of the coating substance thereby establishing a new thickness and a cocorrespondingly new thermal resistance between the associated module and the heat sink.

Figure 5:
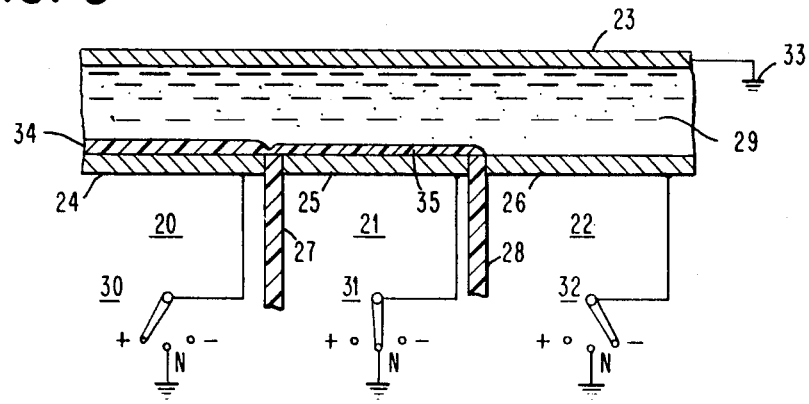
FIG. 5 is a sectional view of an alternate embodiment of modular heat transfer device constructed in accordance with the invention, illustrating a plurality of compartments.

Of course it will be appreciated by those skilled in the art that many different heat transfer structures can be devised using the foregoing principles. By way of example a variant of the structure shown in FIG. 2 is illustrated in FIG. 5. The compartments to be cooled are indicated at 20, 21 and 22. The outer conductive layer of the cooling jacket is a continuous metal sheet 23. Each compartment section has its own inner conductive wall section 24-26 and these are electrically isolated from each other by insulative walls 27-28. The electrolyte fluid 29 enclosed as one mass between the outer layer 23 and the inner layers 24-26 is exposed to selective electric fields in each compartment area in order to establish desired variable coating thicknesses over the inner walls of the compartments. The same mixture of rubber and polytetrafluoroethylene as specified for FIG. 2, may be used. Thus, for example the compartments may be provided with separate switches 30-32 to control selective application of positive, zero and negative voltages to the conductive inner walls 24-26 with respect to the outer wall 23, the latter being grounded as indicated at 33. The switches 30-32 may be replaced by logical circuit elements conditioned by electrical impulses if it is desired to fully automate the cooling system to permit dynamic adjustment to temperature conditions in the individual compartments. By way of example, coatings 34, 35 of different thickness are shown adjacent metal surfaces of compartments 20 and 21 and the compartment 22 is shown to be entirely free of coating.

As mentioned, the arrangement shown in FIG. 5 may be operated to adapt dynamically and automatically to varying temperature conditions in the individual compartments 20-22. Also, if desired, the colloidal particles may be dispersed in the heat sink coolant fluid. Since the electrolyte fluid may be an aqueous dispersion of a mixture of rubber and polytetrafluoroethylene as mentioned above, it will be seen that considerable heat may be transported by circulation of this fluid between the conductors used as electrophoresis electrodes. It will also be understood from the foregoing discussion that deposition of s substance dispersed in the heat sink fluid would occur only over those inner jacket surface sections which are connected to a specific electrical voltage potential; in the present instance, positive.

It will also be appreciated that the cooled compartments need not contain electrical components but may equally well be used as food compartments of a modular food refrigerator.

Thus, it will be understood that in a dynamic system, each compartment would be provided with an initial thermally resistive coating of predetermined thickness, and sensors (not shown) would be provided in each compartment to detect the temperature of the compartment. Upon detecting an excessive temperature in any compartment the sensor would signal the switching elements or circuitry associated with that compartment to cause positioning of the associated switch to the stripping position, thereby decreasing the thickness of the thermally resistive deposit coating. With the switch Color the neutral position the compartment is allowed Color cool at a more rapid rate through its thinner thermal barrier. After a desired temperature is attained the occluded is placed in coating position to reestablish the initial distinctively thickness. It will be appreciated that in a cooling distinct for electrical circuits, the system just described would enable the cooling effort to be concentrated dynamically at the circuits which are most active at any given time and thereby improve the efficiency of cooling. Furthermore, such a system would permit replacement of circuit modules, in repairs of the electrical system, without drastic restructuring of the cooling system to adapt to the specific heat dissipation characteristic of the substituted circuit module.

Figure 3:
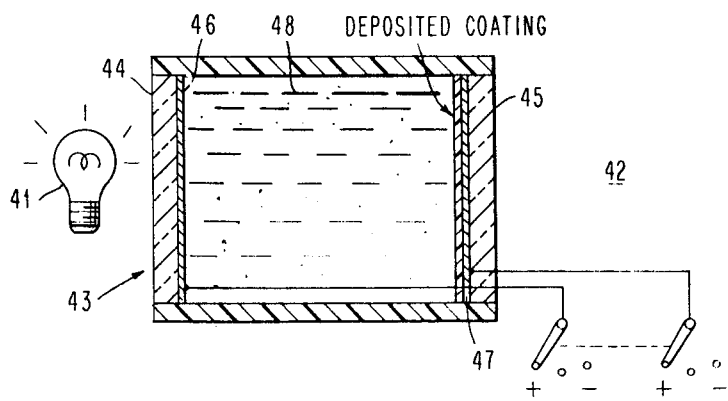
FIG. 3 illustrates a sectional view of an indicating device in which electrophoretic deposits of a substance incorporating a dye material provide an electrically controlled visual indication effect persisting in the absence of electrical control power.

Referring to FIG. 3, the same principles of repeated deposition and removal of coatings may be used to construct indicating devices. Here, a source of light such as 41 illuminates a region of space 42 through a transparent structure 43 including inner and outer layers of glass 44, 45 lined internally with transparent conductive films 46, 47, and enclosing an electrolyte medium 48 consisting for example of an aqueous colloidal dispersion of high molecular weight acrylic polymer mixed with Acid Blue 59, Part I New Color Index, (50315 Part II New Color Index) as a dye substance. Upon deposition of a concentrated coating of the acrylic polymer with the dye occluded the light transmitted to the region 42 assumes a distinctively different appearance in color and intensity thereby registering a distinct indicating impression upon the eye of the viewer in the region 42.

Figure 6:
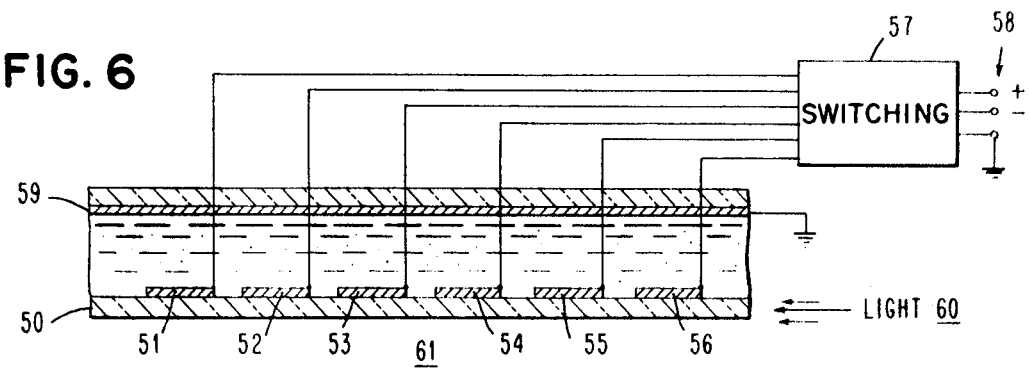
FIG. 6 is a sectional view of a plurality of unit sections of an alternate embodiment of an indicating device constructed in accordance with this invention.

As suggested in FIG. 6 letters or other symbols may be distinctively illuminated in this manner by providing isolated areas of conductive film, shaped in the form of the desired symbols, on the interior of a glass wall 50, such isolated areas being indicated at 51 through 56. These isolated conductive areas are separately connected through a switching system 57 to a supply voltage indicated generally at 58 which is referenced to the ground potential of the outer electrode 59. In general each discrete area would be maintained in a neutral electrical condition and when an indication change is needed in any area a voltage of either positive or negative polarity is applied to that area causing a change in the transmission of light to the viewer. As suggested in this FIG. the material 50 may be made refractive and light 60 may be transmitted edgewise through the material 50 and reflect from the metal areas 51-56 into the region 61 to produce the desired indicating effects.

Figure 7:
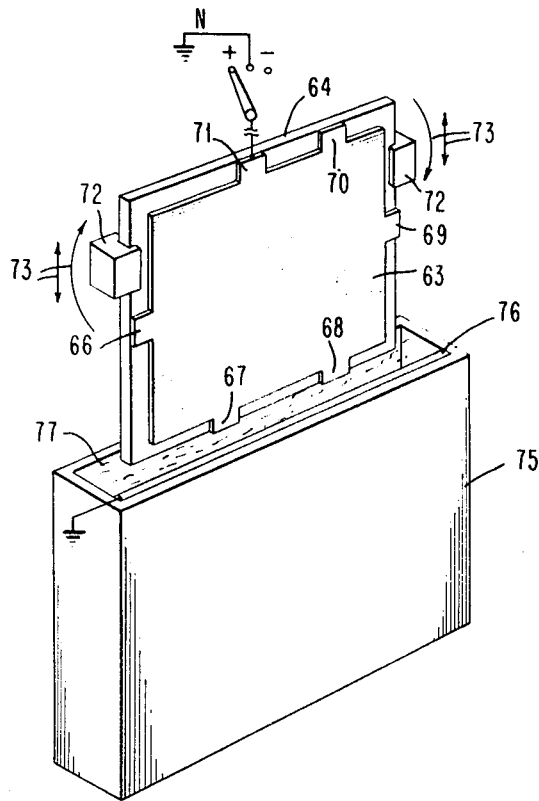
FIG. 7 is a perspective view of an electrical circuit device illustrating still another coating application of the present invention.

Yet another application of the phenomenon under consideration is indicated in FIG. 7 wherein a circuit device consisting of a sheet of copper or the like 63 adhered to a dielectric substrate 64 is to be coated with a protective insulative layer, for example composed of polytetrafluoroethylene, while leaving edge tab portions 66-71 exposed as terminals for connection of external leads. The board 63 may be mounted in a holding member indicated generally at 72 which is mounted for 360° rotation in 90° increments and for vertical displacement as suggested by the arrows at 73. This member is thus vertically movable to displace the circuit device relative to the coating tank 75 containing a grounded electrode 76 and electrolyte fluid 77 in which the coating material is dispersed.

Means are provided for applying positive, negative and zero voltages to the copper surface 63 with respect to the electrode 76. Thus, in sequence a layer of the coating substance may be deposited out of the dispersion by positive voltage to cover the entire copper surface 63 with a desired thickness coating. Then, with zero or disconnected voltage, member 72 may be raised so that only the edge tabs 67 and 68 are submerged in the electrolyte. The reverse voltage may be applied to cause redispersion of the coating on these tabs back into the tank. Then voltage is again disconnected and member 72 is rotated 90° while the coating is still in a wet solvated condition to place another edge tab, for example the edge tab 69 in the solution and again reverse voltage is applied to remove the coating from that edge tab. This action of disconnecting reverse voltage, rotating member 72, and reconnecting reverse voltage may be repeated before the coating has dried until all edge tabs 66–71 have been stripped.

We have shown and described above the fundamental novel features of the invention as applied to several preferred embodiments. It will be understood that various omissions, substitutions and changes in the form and detail, of the invention as described herein, may be made by those skilled in the art without departing from the true spirit and scope of the invention. It is the intention therefore to be limited only by the scope of the following claims.

What is claimed is:

1. The method of forming and utilizing variable thickness coatings of polymeric substances on metallic substrata comprising:
   immersing an uncoated object having an electrically conductive surface in a liquid electrolyte medium containing a colloidal dispersion of an electrophoretically depositable organic polymeric film forming substance which is redispersable from the deposited condition into said electroltye medium so long as the deposit remains wetted by the liquid of said medium;
   applying an electrical potential to the said conductive surface of said object sufficient to cause electrophoretic deposition of said substance upon said surface;
   maintaining said potential for a predetermined period of time in order to build up said deposition to a coating of predetermined thickness;
   maintaining said deposited coating in a solvated wet condition for an indefinite period of time; and
   with said coating still wet and said object at least partially immersed in said electrolyte medium, applying a reverse electrical potential to said object of sufficient magnitude and for a sufficient time duration to redisperse said coating in said medium.

2. In a method of selectively applying coatings of a film forming redispersible substance to an electrically conductive surface portion of an article the steps of:
   causing said conductive surface portion of said article to contact an electrolyte bath containing a colloidal suspension of an organic film forming substance and having an electrode separately in contact therewith;
   applying an electromotive force between said surface portion of said article and said electrode causing a coating of a predetermined thickness of said organic substance to deposit by electrophoresis upon said surface portion;
   disconnecting said electromotive force from said article and maintaining said coating in a solvated wet condition for an indefinite period of time;
   causing all or a part of said surface portion to contact or remain in contact with said bath; and
   applying a reverse electromotive force between said surface portion and said electrode until a predetermined portion of said coating is redispersed into said bath exposing a once covered portion of said surface.

3. In a method of selectively depositing and utilizing coating of an organic film forming redispersible substance on a substrate object, the steps of:
   causing an electrically conductive surface portion of said substrate object to contact an electrolyte liquid bath having the said organic film forming substance dispersed therein in a colloidal state and having an electrode in separate contact therewith;
   applying an electromotive force between said surface portion of said object and said electrode causing electrophoretic deposition at said surface portion of a predetermined thickness coating of said dispersed organic substance;
   removing said electromotive force and maintaining said coating in contact with said electroltye bath;
   applying at an arbitrary time thereafter a reverse electromotive force between said surface portion of said object and said electrode causing redispersion into said electrolyte bath of a predetermined portion of said coating; and
   repeating said steps of intermittently applying said deposition and redispersion causing electromotive forces at arbitrary intervals of time to cause deposition and redispersion of said substance.

4. The method of claim 3 wherein said organic film forming redispersible substance satisfies a predetermined test which includes repeated electrophoretic deposition and removal of a coating thereof upon a surface of a metal article of a standard shape and size, said removal being observed by visual inspection of the redispersion of particles into the electrolyte or the surface of said article.

5. The method of claim 4 wherein said surface contains copper.

6. The method of claim 5 wherein said substance is polytetrafluoroethylene.

7. The method of claim 5 wherein said substance is polystyrene.

8. The method of claim 5 wherein said substance is acrylic.

9. The method of claim 5 wherein said substance is vinyl acetate/maleate copolymer.

10. The method of claim 5 wherein said substance is a material selected from the class of polymeric hydrocarbons and halogenated derivatives thereof.

11. The method of claim 10 wherein said substance is mixed with rubber in dispersion to provide depositions of substantial thicknesses on the order of one-eight inches which have substantial thermal resistance.

12. In a method of selectively and reversibly applying coatings of a film forming redispersible substance over a conductive surface of an article the steps of:
   causing said surface to contact a bath containing an aqueous dispersion of a substance selected from the class of polymeric hydrocarbons and halogenated derivatives thereof, said bath having an electrode in separate contact therewith;
   applying an electrical difference in potential of one polarity, between said surface and said electrode;
   maintaining said applied potential difference for a predetermined time to establish an electrophoretic coating of said substance having a predetermined thickness;
   removing said potential difference to terminate the growth of said coating;
   maintaining said coating in a solvated condition for an arbitrary interval of time following removal of said potential difference;
   causing all or a part of said surface to contact said bath; and
   applying a second voltage to said surface with a polarity opposite to said one polarity to diminish the thickness of said coating by redispersion of said substance from the wet coating to the bath.